(12) United States Patent
Wenzel et al.

(10) Patent No.: US 6,719,822 B1
(45) Date of Patent: Apr. 13, 2004

(54) PROCESS FOR DECONTAMINATION

(75) Inventors: Walter W. Wenzel, Vienna (AT); Domy C. Adriano, Aiken, SC (US)

(73) Assignee: Stadt Wien, Vienna (AT)

( * ) Notice: Subject to any disclaimer, the term of this patent is extended or adjusted under 35 U.S.C. 154(b) by 81 days.

(21) Appl. No.: 09/947,342

(22) Filed: Sep. 7, 2001

(30) Foreign Application Priority Data

Sep. 7, 2000  (AT) .............................................. 1525/00

(51) Int. Cl.⁷ ................................................ C22B 3/18
(52) U.S. Cl. ....................................................... 75/712
(58) Field of Search ........................................... 75/712

(56) References Cited

U.S. PATENT DOCUMENTS 5,320,663 A     6/1994   Cunningham
5,476,788 A  * 12/1995   Lamar et al. ............ 435/262.5
5,927,005 A     7/1999   Gardea-Torresdey et al.

* cited by examiner

*Primary Examiner*—Melvyn Andrews
(74) *Attorney, Agent, or Firm*—Young & Thompson

(57) ABSTRACT

Material is decontaminated of a pollutant by using perennial woody plants with the ability to accumulate the pollutant in the leaves in high concentrations. The decontamination is based on a combination of phytoextraction, pollutant transport with the falling of the leaves to the material surface, leaching of the pollutant out of the leaves decomposing on the material surface, and (physico-)chemical fixing of the pollutant in a reactive layer which is bounded by geotextiles and which physically and/or chemically binds the pollutant.

33 Claims, 6 Drawing Sheets

US 6,719,822 B1

PROCESS FOR DECONTAMINATION

FIELD OF THE INVENTION

The invention relates to a process for decontamination (phytoremediation) of materials such as soils, sludges, sediments, wastes, industrial deposits and for continuously keeping clean, on a preventative basis, filter bodies consisting of these or similar material (phytoprevention) for cleanup of waste water such as roof runoff, road runoff, community sewage, industrial waste water which is loaded with at least one pollutant from the group of heavy metals, metalloids, halides and/or radionuclides, in which the pollutants are removed from the material by phytoextraction by means of woody plants which extract the pollutants to be removed from the contaminated material from the soil and accumulate it in the leaves. In particular, the process is intended for in situ decontamination of pollutant-loaded soils, sludges, sediments or similar materials.

BACKGROUND OF THE INVENTION

The absorption of pollutants in plants using preferably deep-rooted species represents an environmentally nondestructive technology for removal of pollutants, especially heavy metals and radioactive materials, from soils and similar materials.

U.S. Pat. No. 5,927,005 A relates to a process for decontamination of soils which contain heavy metals. Here phytoremediation (phytorehabilitation) is to be used. In particular metals such as copper, nickel, and cadmium will be removed from soils using perennial plants.

In doing so the metals to be removed from the soil will accumulate in unimportant tissue parts of the plants so that the plants can continue to be used.

In the phytorehabilitation described in U.S. Pat. No. 5,927,005 A bushes will be either cut completely down or partially cut back to collect the metals which have accumulated in the bushes. This is done especially once a year. In order to obtain metals which have accumulated in the leaves and stems, the dried plant material can also be extracted with an aqueous acid according to the process of U.S. Pat. No. 5,927,005 A.

U.S. Pat. No. 5,320,663 A describes a process for obtaining lead and organo-lead compounds from contaminated materials using metal-accumulating plants. In the process of U.S. Pat. No. 5,320,663 A the plants will be harvested in whole or in part in order to obtain the lead which has accumulated in them. Here the volume of the harvested plants or plant portions will be reduced if necessary after reduction of volume by incineration, anaerobic or aerobic decomposition, acid digestion or composting and then the plants or portions of them will be subjected to a heat treatment process (smelting).

Usually the contaminated plant material is seasonally harvested in the known processes and the resulting harvest residues are composted or burned; both are associated with relatively high costs (compare U.S. Pat. No. 5,320,663 A). The "handling" of contaminated materials leads to additional exposure of workers (and the environment) to pollutants. Another problem is that the periodic or seasonal harvesting of plant biomass (compare U.S. Pat. No. 5,320,663 A) and U.S. Pat. No. 5,927,005 A) leads to plants' dying off or under certain circumstances to a two to three year regeneration period and the process of phytoextraction is interrupted for this time interval.

Processes of phytoextraction known to date are often based on annual plants with either high pollutant accumulation and low biomass (hyperaccumulators, for example *Thlapsi caerulescens*) or with relatively low pollutant accumulation and high biomass (for example, *Brassica juncea*). To increase pollutant removal in the latter case, chelate-forming agents such as ethylene diaminotetraacetic acid (EDTA) or nitritotriacetic acid (NTA) are used, which in addition result in high costs and the possibility of long-lasting leaching of pollutants into the groundwater. Especially for heavy metals and radionuclides thus no nondestructive, economical and ecologically acceptable rehabilitation technologies are available with which pollutants can be removed from contaminated material.

SUMMARY OF THE INVENTION

The object of the invention is to make available a process of the initially mentioned type which is simple to carry out and is still effective.

This object is achieved with the inventive process which comprises the following process steps:

b) application of a layer of material which chemically and/or physically binds at least one pollutant on the soil surface in an area of woody plants;

c) collection and composting of the natural leaf fall on the layer;

d) leaching of the pollutant out of the leaves decomposing on the layer; this leaching can also and especially be passive leaching, for example by precipitation, such as rain, dew, etc.;

e) physical and/or chemical binding of the pollutants in the layer in order to interrupt the bio-geochemical circulation of the pollutants and in order to enable regeneration of the material of the layer; and f) removal of the layer after the goal of decontamination has been reached.

Following step f) the material of the layer can be eluted for example with a solvent (such as ethylene diaminotetraacetic acid=EDTA) for recovery of the pollutants and for further concentration of the pollutants and for regeneration of the material of the layer.

The process of the invention is carried out using perennial, generally woody plants with high biomass production and the ability to accumulate pollutants in the leaves in high concentrations. In particular, suitable plants are representatives from the family of willows (Salicaeceae), poplars (Salicaeceae) and birches (Betulacaea).

The process of the invention is based on a novel combination of phytoextraction (absorption of pollutants by the plants and transport into the above-ground parts of the plant such as the leaves, branches and trunk), pollutant transport with falling of the leaves to the soil surface, leaching of the pollutants out of the leaves decomposing on the soil surface and (physico-)chemical fixing of the leached pollutants in a reactive layer usually produced before planting, bounded for example by geotextiles, with a composition (for example clay minerals, oxides) and layer thickness which can be matched to the type and degree of burden of the pollutants to be fixed and the expected remediation interval.

For example, embodiments of the process of the invention are explained below.

Phytorehabilitation (phytoremediation) is a promising rehabilitation method which uses the ability of selected plant species or their ecotypes/varieties to fix pollutants in contaminated soils either in a form insoluble in water or to remove them from the soils (or waste waters).

The process step of the invention in which the pollutants are removed from the contaminated (soil) material (or sediments, sludges, wastes, industrial dumps, etc.) by transport into the plant biomass and accumulation in it is called phytoextraction.

The disadvantages of the known processes of phytoremediation of contaminated materials (soils, sludges, sediments, wastes, etc.) are eliminated with the inventive process by the phytoextraction being combined with (physico-) chemical fixing (immobilization) of the pollutants after natural leaf fall in the inventive process. Thus the interruption of phytoextraction caused by harvesting is avoided and the efficiency of the phytoextraction can be increased. To bind the pollutants at least one layer which physically and/or chemically. binds the pollutants is applied to the soil surface to fix the pollutants which have leached out of the decomposing leaves, branches and limbs ("pollutant trap").

The layer which physically and/or chemically binds the pollutants can be made such that (physico-)chemically reactive materials with a layer thickness of preferably a few centimeters are bounded like a sandwich by geotextiles with a long lifetime. The layer which physically and/or chemically binds the pollutants can, depending on the extent and type of contamination, be structured such that it remains usable for twenty years or longer for pollutant fixing.

The layer which physically and/or chemically binds the pollutants after preparation of the terrain can be delivered by hand or mechanically (in the case of prefabricated products, for example in a sandwich-like structure geotextile—reactive material—geotextile) or using spreading or spraying devices (for example, a clay mineral—bitumen—straw—mixture).

The layer which physically and/or chemically binds the pollutants after the rehabilitation interval or when its pollutant fixing capacity is exhausted can be removed for example by tractors with scraping and lifting devices. The layer which physically and/or chemically binds the pollutants and which has accumulated the pollutants can be regenerated on site or after transport to secured facilities (for example, a dump) with recovery and further concentration of the pollutants (for example by washing (elution) with solvents, for example EDTA, and recovery of heavy metals), or according to the pertinent legal regulations at a volume which has been greatly reduced compared to the originally contaminated material, it can be safely and relatively economically dumped.

During the entire remediation interval (in many cases several decades) some of the costs of the process can be balanced by the case-by-case and/or partial harvesting and use of woody biomass to produce renewable raw materials (biofibers, paper/cardboard, industrial alcohol, biospirit, etc.) or energy. The inventive process thus enables continuous use of the plants during remediation.

The inventive process can be carried out on site (in situ), but is not limited to this version.

Pollutants which can be removed with the inventive process from contaminated material comprise heavy metals (for example, Pb, Cd, Zn), metalloids (for example, As) and radionuclides (for example, Sr).

Preferably suitable plants are mainly fast growing, woody representatives of the plant families of willow growths (Salicaeceae), poplar growths (Salicaeceae) and birch growths (Betulaceae). Varieties, clones and ecotypes with the ability to accumulate at least one or more pollutants, especially heavy metals such as Pb, Cd and Zn in the leaves, especially in high concentrations, are used.

Suitable materials for the layer which physically and/or chemically binds the pollutants comprise materials or material combinations with high binding capacity for the pollutant(s) under consideration, especially clay minerals (for example, vermiculite), oxides of iron, aluminum, or manganese and poorly soluble phosphates (apatites). It is advantageous that in the inventive process also residual materials from industrial processes can be used.

The process of phytoextraction can be used not only for decontamination of solid (phytoextraction in a narrower sense) or liquid (rhizofiltration) media after contamination with pollutants exceeding legal and/or scientifically sound rehabilitation thresholds for phytoremediation (phytorehabilitation). The inventive process can also be carried out in the sense of phytoprevention. In this embodiment the process is used for continuous preventative cleanup of soil filters (or filter bodies and similar materials) which are used to purify waste water. In doing so the amount of pollutants delivered via the waste water to the filter within one year (summer and winter) is removed again by the plants during the vegetation period and accumulated in the leaves. The soil filter can thus remain permanently in use since its capacity is not exhausted. The contaminated leaves can be further treated, and decomposition (composting) can take place in situ or ex situ (but conventionally on-site).

BRIEF DESCRIPTION OF THE DRAWINGS

Other details, features and advantages of the inventive process arise from the following description of embodiments with respect to the drawings.

DETAILED DESCRIPTION OF THE INVENTION

Figure 1:
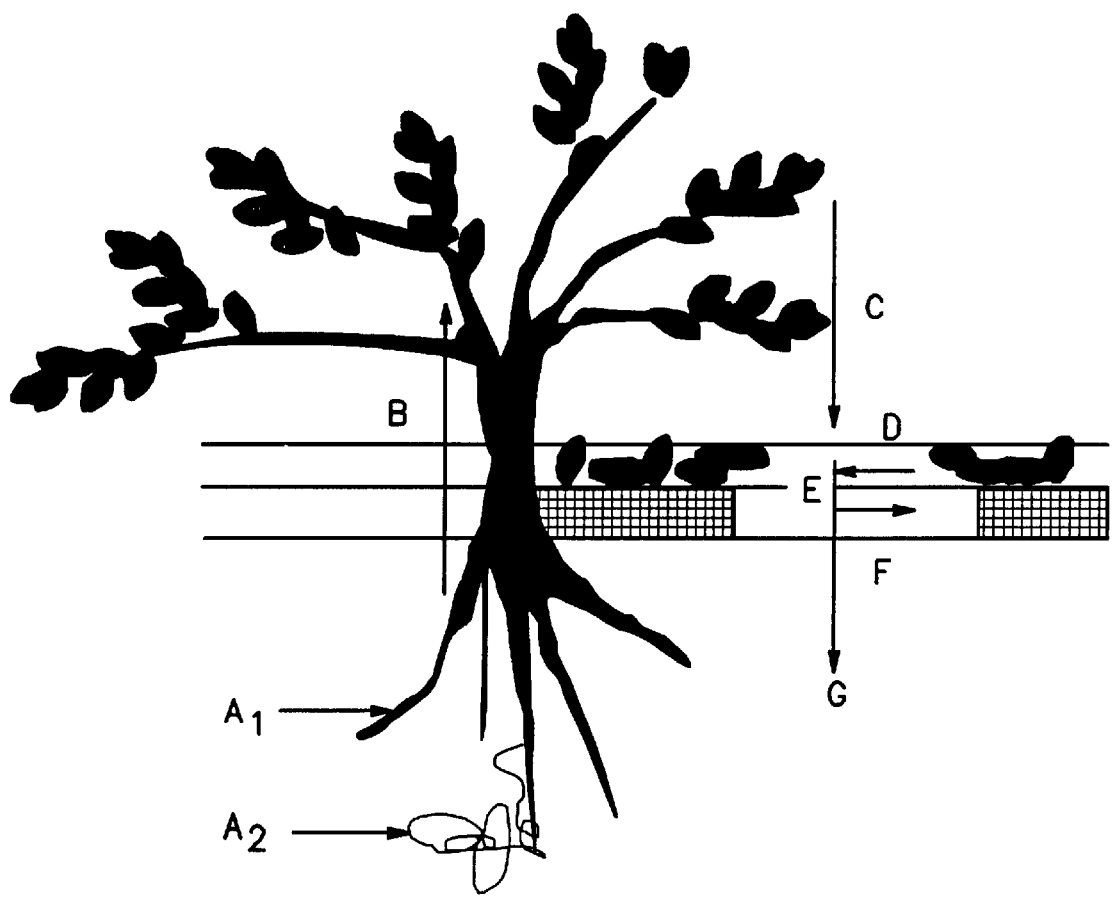
FIG. 1 schematically shows component processes in the execution of the process.

The schematic from FIG. 1 shows the most important component processes of the inventive process:

Component process $A_1$—direct absorption of the pollutants by the plant roots;

Component process $A_2$ —absorption of pollutants via mycorrhizae associated with the roots (alternative or parallel absorption path to $A_1$);

Component process B—movement of the pollutants within the plants from the roots into the trunk and/or into the leaves;

Component process C=natural fall of leaves (and leaching of pollutants out of the crown top);

Component process D—release of pollutants from the leaf layer undergoing microbial decomposition into the infiltrating precipitation water with the participation of (physico)-chemical dissolution and desorption reactions and microbial decomposition;

Component process E—infiltration of the pollutant-loaded drainage water into the reactive layer which physically and/or chemically binds the pollutants;

F=fixing (immobilization) of the pollutants in the layer which physically and/or chemically binds the pollutants, G=infiltration of the low-pollutant drainage water into the soil.

Figure 2A:
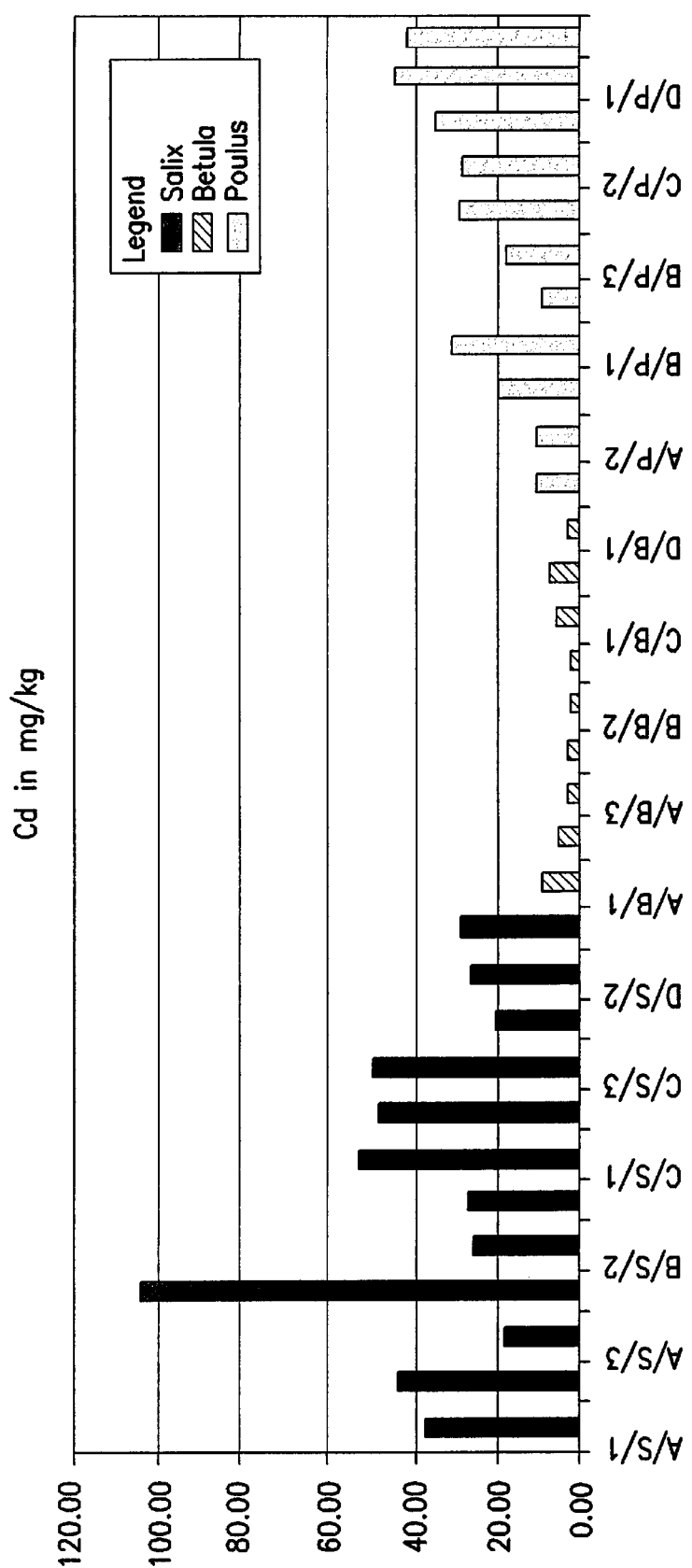
FIGS. 2A to 2C show diagrams of the concentration of the pollutants in the leaves.
Figure 2B:
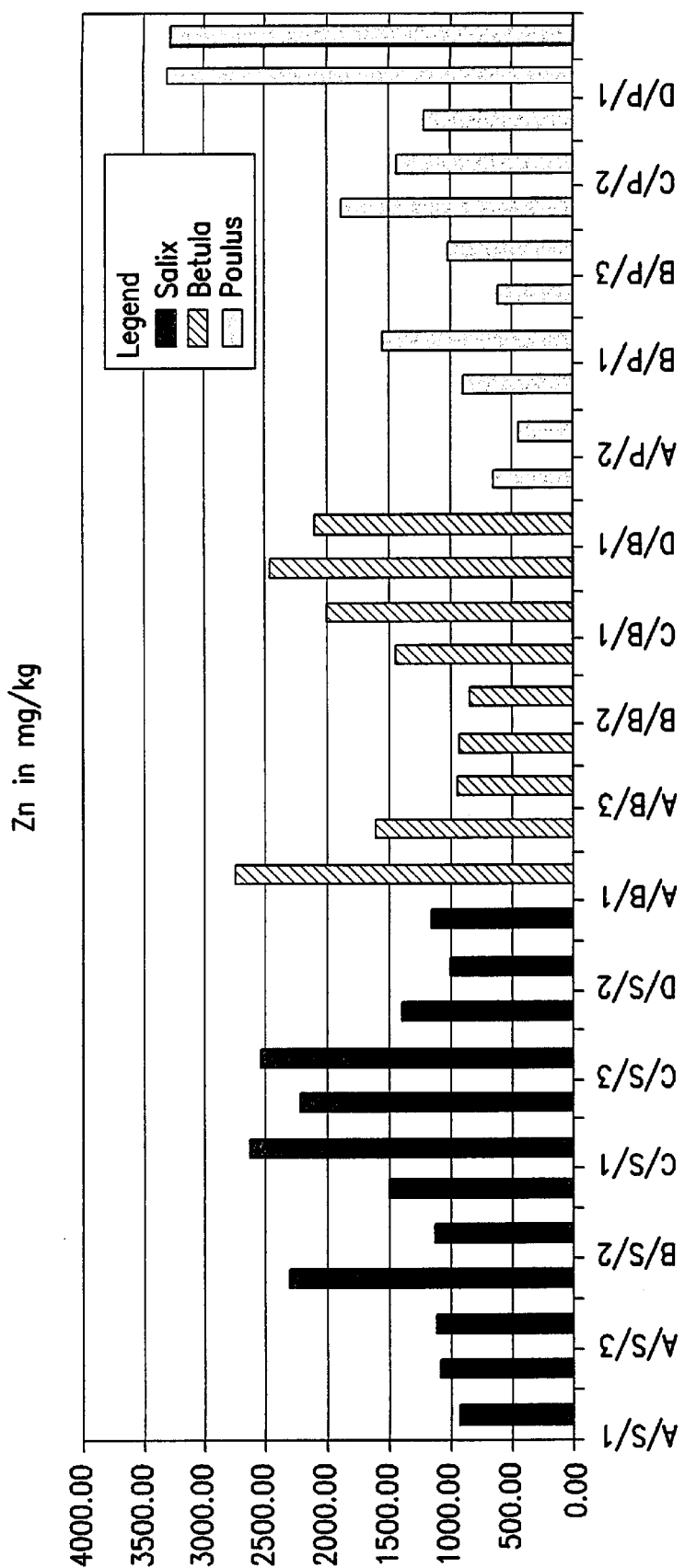
Figure 2C:
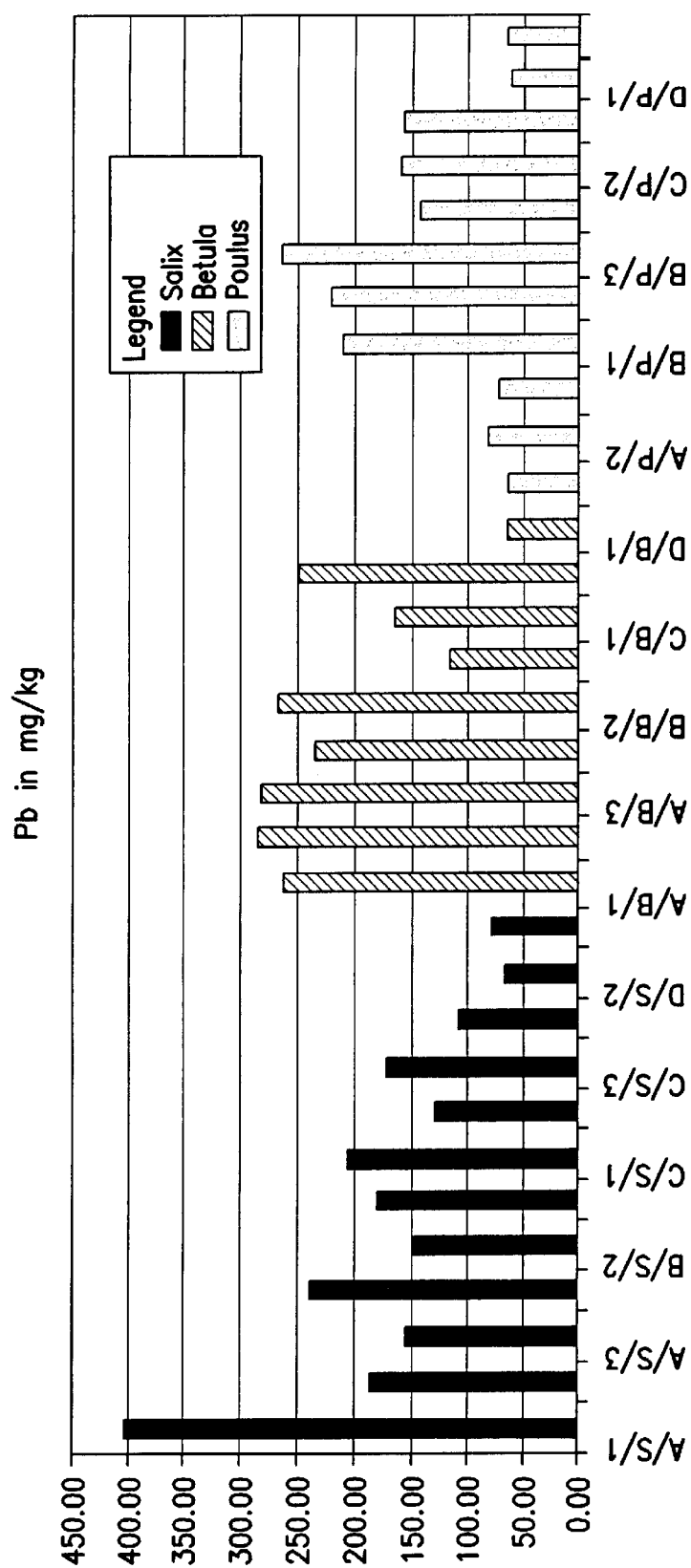

FIG. 2 shows the concentrations of cadmium (FIG. 2A), zinc (FIG. 2B), and lead (FIG. 2C) in the leaves of various individual willows (*Salix caprea*), poplars (*Populus tremula*) and birches (*Betula pendula*) at four locations burdened with these metals (A–D) (Arnoldstein, Carinthia). The leaves were collected in autumn (1999) shortly before falling of leaves.

Figure 3:
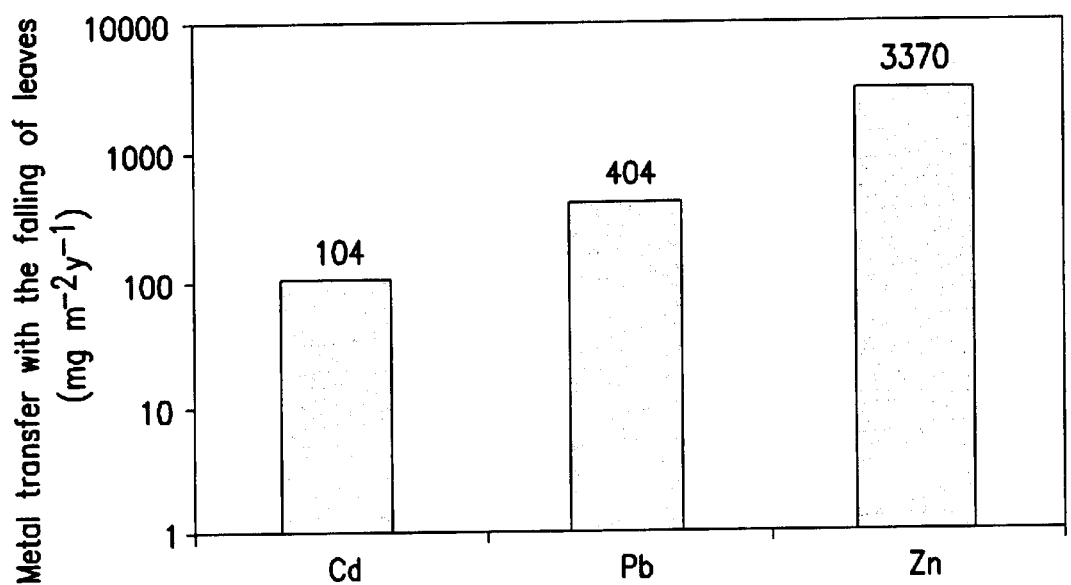
FIG. 3 shows the pollutant flow with the leaves.

FIG. 3 shows the metal flow which is the maximum attainable with the plants with falling of leaves (component process C). The values for cadmium and zinc relate to willows, those for lead to birches.

Figure 4:
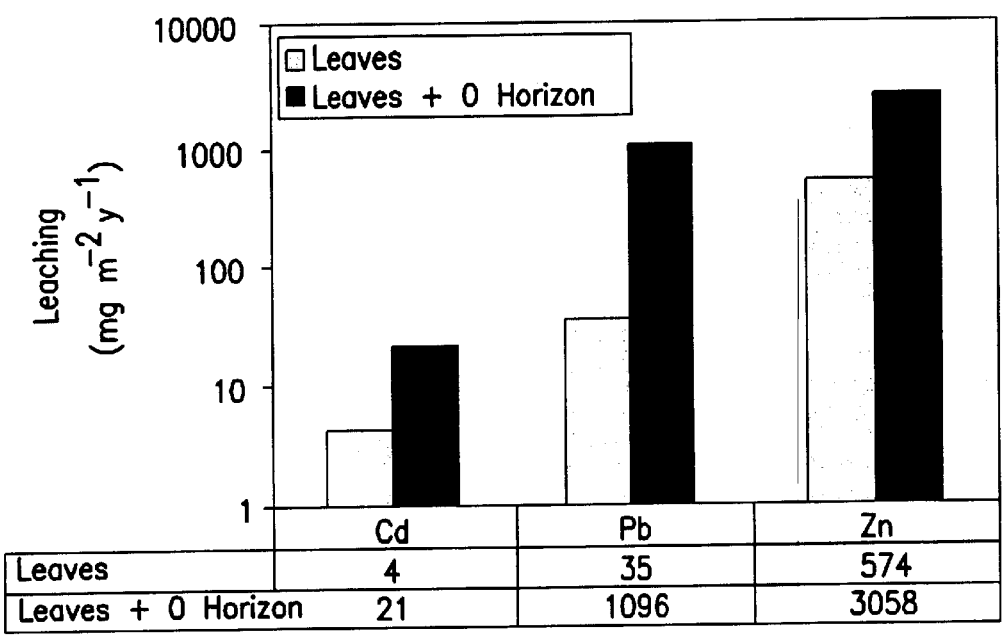
FIG. 4 shows diagrams of the progression of a leaching test and FIG. 5 schematically shows processes in the execution of the process with a flow balance.

FIG. 4 shows the metal flows achieved after three months of a leaching test and extrapolated to one year by leaching out of a layer of leaves collected immediately after the leaves fell (in autumn 1999 at the Arnoldstein site and the organic layer (0)+leaf layer collected at the same site). The precipitation simulated in the test corresponds in terms of amount, pH and ion strength roughly to the conditions at the site (Arnoldstein), the layer thickness of the leaves and 0 horizon (=organic layer horizon over the mineral soil consisting mainly of leaves in various stages of decomposition) was likewise matched to the conditions found beforehand at the site. Since both the leaf samples and the 0 horizon samples are mixed samples which originate from a larger number of individual willows, poplars and birches, the metal concentrations in the leaves and the 0 horizon compared to the maximum attainable are relatively low. The metal flows which can be attained at maximum with the best individuals at the same site by leaching out of the leaf layer and the leaf+0 horizon are up to five times higher.

Figure 5:
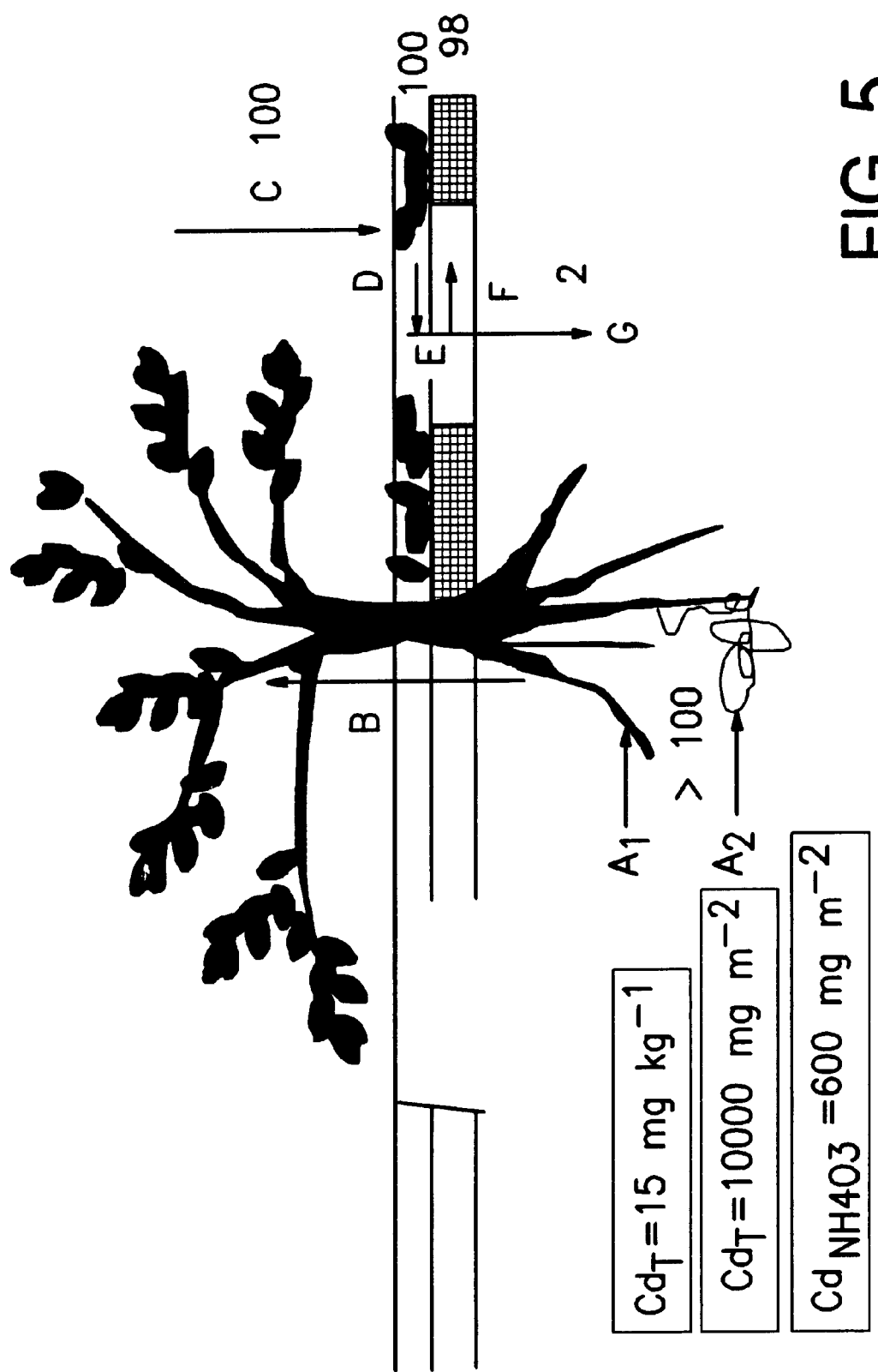

FIG. 5 shows a flow balance for cadmium in the inventive process and the component processes shown in FIG. 1. The letters A–F relates to the component processes from FIG. 1. The numbers written in italics indicate the pertinent cadmium flows in mg/m$^{-2}$. For the total content of cadmium in the soil measured at the site (Arnoldstein) of roughly 15 mg/kg$^{-1}$ (at a rehabilitation depth of 0.5 m and a storage density (=(soil) mass per unit of volume g/cm$^{-3}$) of the soil of roughly 1250 kg/m$^{-3}$ this corresponds to roughly 10,000 mg Cd/m$^{-2}$), accordingly up to more than 100 mg Cd/m$^2$ can be absorbed in the willows. Based on leaf studies at the site (Arnoldstein) (up to 103 mg Cd/kg$^{-1}$ dry substance in leaves) for an amount of fallen leaves of 1 kg/m$^{-2}$ recirculation to the soil surface of roughly 100 mg/m$^{-2}$ can be achieved. At an efficiency of vermiculite as the pollutant-binding layer of 98%, annually 98 mg/m$^{-2}$ can be fixed in the layer which chemically and/or physically binds the pollutants, only 2 mg/m$^{-2}$ return to the soil. With the cadmium removal rates computed in this way the easily available and mobile cadmium (measured on a 1 M NH$_4$NO$_3$ extract) could be easily extracted from the soils within 6 years. Thus the risk potential of the site with respect to leaching and toxicity for soil organisms in spite of the high burden is greatly reduced in a few years.

In the inventive process which comprises phytoextraction, natural falling of leaves, dissolution and leaching of the pollutant out of the decomposing leaves on the soil surface and pollutant fixing in the layer which physically and/or chemically binds the pollutants and which has been applied to the soil surface, for example preferably the agents/plants described below can be used.

In the inventive process, for the component process of phytoextraction, pollutant-accumulating varieties, clones or ecotypes of fast growing tree and shrub species can be used, for example willows (Salix), poplar (Populus) and birches (Betula) or other plants able to absorb radionuclides and heavy metals such as uranium, lead, cadmium, zinc, nickel, etc., from contaminated materials such as soils or sediments and to accumulate them in the harvestable parts, especially in the leaves. It is also possible to combine different varieties of tree or shrub species with one another.

The success of the component process of phytoextraction is influenced not only by the chosen plants, but also by the mycorrhizae associated with them and other microorganisms in the rhizosphere which can modify, especially benefit, the absorption of pollutants. The choice of associated microorganisms in the rhizosphere can in certain cases represent an important element of the phytoextraction component process. Especially in willow species are the ectomycorrhizae and endomycorrhizae important for tolerance to high pollutant concentrations and the absorption of pollutants in the plant roots. The biomass which is rotting on site due to the natural crown passage and scrap (leaves, twigs, branches) or after cutting of the plants in the course of the rotting process releases pollutants which return to the soil (and ground water) without the use of other measures via the biogeochemical cycle.

The inventive process is aimed at physical and/or chemical fixing (immobilization) and concentration of pollutants by covering the soil surface with (physico)-chemically reactive materials in the form of a layer which physically and/or chemically binds the pollutants.

The inorganic and possibly also organic pollutants which are released in the course of rotting of leaves or which are being dissolved travel by infiltration of the contaminated drainage water into the layer which physically and/or chemically binds the pollutants, where they are fixed with high efficiency (especially >90% over the chosen time interval) and are accumulated over the long term.

The soil surface is prepared if necessary before application of the layer which physically and/or chemically binds the pollutants such that maximum retention of the drainage water released from the contaminated plant material is ensured. To do this, sufficiently fast infiltration into the soil under the layer which physically and/or chemically binds the pollutants is necessary to prevent elutriation and surface outflow. Preparatory measures can therefore comprise partial levelling of the terrain and terracing, but also measures to increase soil permeability (infiltration rate). The latter can be done among others by mechanical working (plowing, trenching, subsoil loosening) or by adding organic (compost) or inorganic materials (lime, sand) to improve the soil structure.

In addition to at least one reactive material, the layer which physically and/or chemically binds the pollutants preferably comprises for example binders (for example, bitumen), structure agents (for example, straw) and/or boundary means (for example, geotextiles) and in certain cases also conditioning materials in order to establish a chemical environment suitable for pollutant fixing (for example, lime for raising the pH).

The layer which physically and/or chemically binds the pollutants or the material layer is usually applied before planting of the phytorehabilitation vegetation on the soil. Application of prefabricated layers which physically and/or chemically bind the pollutants with the chosen layer thickness (for example, composed of reactive materials jacketed by geotextile) can be done by hand or mechanically using tractors with a lifting device. Alternatively, at least one reactive material with the corresponding layer thickness can be delivered either loosely (spreading carts) or in combination with binders and/or structure materials. One example is delivery by a spraying process, and for example straw as the structure material (carrier material), bitumen as the binder, and finally reactive material (vermiculite) can be applied.

The "reactive" part of the layer which physically and/or chemically binds the pollutants consists of at least one material which can effectively retain the pollutants to be removed at the time. To do this, among others individually or in combination, the following are suited: hydroxyapatite (especially for lead), iron and manganese oxides (especially for anionic forms of chromium and metalloids such as arsenic), clay minerals (for almost all cationic heavy metals such as for example cadmium and zinc).

If necessary, as detailed above, structure materials and binders are used to ensure sufficient stability and optimum permeability of the layer which physically and/or chemically binds the pollutants.

Contaminated sites can be for the most part fenced in order to preclude access to wild animals and other herbivores to the terrain being rehabilitated.

Removal and further treatment and/or storage of the saturated (exhausted) layer which physically and/or chemically binds the pollutants represent another component step of the inventive process. First the stand is cleared and organic material which may be present and which lies on the layer which physically and/or chemically binds the pollutants is removed, for example using mechanical collection devices (for example with a combined raking and suction device). The removal of the layer which physically and/or chemically binds the pollutants takes place for example likewise mechanically using tractors which are equipped with the corresponding lifting devices or a combination of raking and suction unit. The storage of the layer which physically and/or chemically binds the pollutants compared to the originally contaminated material requires only a highly reduced volume.

At a rehabilitation depth of 50 cm (root space) and a 1 cm thick reactive layer which physically and/or chemically binds the pollutants the volume to be deposited (if no regeneration takes place) is reduced by a factor of 50. If in the course of rehabilitation a total of 5 cm of reactive material should be necessary, the volume would be reduced by a factor of 10.

In addition, it is possible to regenerate the reactive material by leaching the pollutants with solvents and to recover the dissolved out metals. The solvent can be cycled. For cationic metals, especially lead and copper, mainly chelate forming agents such as EDTA as the solvents are possible. The regeneration of the layer which physically and/or chemically binds the pollutants and the recovery of metals can contribute to coverage of the rehabilitation costs.

Savings result in the inventive process by reduction of material use for the layer which physically and/or chemically binds the pollutants and by the reduction of dumping space for the saturated layer material which physically and/or chemically binds the pollutants. Regeneration and recovery also improve the ecobalance of the inventive process.

With simultaneous contamination with decomposable organic pollutants, rhizosphere processes (root-microbe associations) in the root space of the phytoremediation stand (for example, willows, poplars) in many cases can contribute to faster decomposition and decontamination of these organic compounds, by which joint treatment of inorganic and organic impurities is possible.

The woody biomass which grows during the rehabilitation interval or the component intervals (if the pollutant content of the woody biomass is low enough for use) can be used to produce renewable energy, industrial fibers, alcohol, and/or biofuels or for any other economically useful and ecologically compatible purpose.

The inventive process comprises preferably the following component processes or steps (see also FIG. 1).

A) extraction of pollutants from the contaminated substrate by absorption into roots, optionally with the participation and associated mycorrhizae.

B) transport of pollutants from the roots to the aboveground biomass, especially into the leaves.

C) transfer of the plant biomass, mainly of leaves, from the crown space to the layer which physically and/or chemically binds the pollutants, mainly when the leaves are falling, but also at other times (for example by leaching of pollutants from the crown space) or when the plants or plant parts die;

D) microbial decomposition of the contaminated organic layer from the biomass and release of pollutants into a mobile, water-soluble phase as a result of microbial decomposition and phytochemical desorption or chemical solution reactions;

E) leaching of the dissolved pollutants from the scattered layer (biomass) and infiltration into the layer which physically and/or chemically binds the pollutants;

F) fixing the pollutants in the layer of reactive material; this process is generally promoted by simultaneous release of dissolved organic substances which by complexing of cations (for example, lead) or ion competition with (oxy)anions (for example, arsenate, chromate) promote the movement of the pollutants into the layer which physically and/or chemically binds the pollutants; and/or fixing of the pollutants in the reactive layer which physically and/or chemically binds the pollutants by reactions such as precipitation (as in the case of the reaction of lead with hydroxyapatite), absorption and chemisorption (for example, when fixing metals or metalloids with oxides of iron/manganese, clay minerals), etc.

G) infiltration of the low-pollutant drainage water into the soil.

The inventive process prevents further movement of pollutants in soil or re-absorption by plant roots, by which the pollutant concentration in the substrate (soil, etc.) is reduced.

Tests have shown that >90% cadmium, lead and zinc are retained by the vermiculite layer which physically and/or chemically binds the pollutants.

As soon as the desired degree of purification of the substrate (soil, sediment, sludges, waste, etc.) or the saturation potential of the layer which physically and/or chemically binds the pollutants is reached, the layer which physically and/or chemically binds the pollutants can be removed and further treated or can be dumped in an environmentally friendly manner.

EXAMPLE 1

Choice of Ecotypes

The fundamental suitability of woody plants for use in the inventive process is indicated by checking the accumulation of lead, zinc, and cadmium in the leaves of ecotypes, especially of the species *Salix caprea, Populus tremula* and *Betula pendula* at sites loaded with heavy metals. This test was done (in spring 1999) at the Redlschlag and Arnoldstein sites. Leaves of representatives of various woody plant species were collected and after decomposition with an acid mixture by means of ICP-MS (inductively coupled plasma mass spectrometry, laboratory of MA 22, city of Vienna) the content of the heavy metals Pb, Zn and Cd was measured. Based on the promising results for the Arnoldstein site, in autumn 1999 at this location a second test was run, individual trees and bushes being tested separately and identified for their further reproduction. In addition, separately by individuals, soil was removed from the root space in order to determine the total content (decomposition with aqua regia) and the available proportion (1M ammonium nitrate extract) of the heavy metals lead, zinc, and cadmium.

The results of the second test confirm those of the first test and are shown in FIG. 2. Cadmium was accumulated in the leaves of willows in concentrations up to more than 100 mg/kg$^{-1}$ dry substance. In the poplars, up to 40 mg cadmium/kg$^{-1}$ was reached, conversely in birches sufficient accumulation of cadmium was not established. The soil contents of cadmium were between 5 and 50 mg/kg (total) and 0.05 to 5 mg/kg$^{-1}$ (ammonium nitrate). Therefore cadmium accumulates in the leaves of Salix up to ten times the total content in the soil.

Lead was accumulated up to 400 mg/kg$^{-1}$ in the dry substance of willow leaves. Good results (up to roughly 250 mg lead/kg$^{-1}$) were also achieved with birches and some individual poplars.

Zinc accumulation in the leaves of poplars was up to 3400 mg/kg$^{-1}$. In beeches up to 2700, with willows up to 2600 mg zinc/kg$^{-1}$ dry leaf substance were accumulated.

The results confirm the suitability of willows, poplars, and birches for the component processes of phytoextraction in soils burdened with lead, zinc, and cadmium. They represent one example for attainability of a relatively high accumulation of pollutants in the leaves of woody plants as the sum of the component processes A and B.

EXAMPLE 2

Propagation of Metal-accumulating Individual Willows, Poplars and Birches

In spring 2000 at the Arnoldstein site, individual cuttings of willows, poplars and birches with the accumulation of lead, zinc and cadmium known from the 1999 test were removed and placed in a greenhouse. Cultivation is done in the greenhouse in sand culture (Brauchmann vessels). This example confirms the possibility of identical breeding of heavy metal-accumulating ecotypes of woody plant species which can be used when the process of the invention is carried out.

EXAMPLE 3

Metal Transfer with the Fall of Leaves to the Soil

In autumn 1999, immediately after the fall of leaves at the Arnoldstein site, leaf samples (willows, poplars and birches) were removed from the soil surface and stored cool and dry until further use. The amount of leaves falling to be ground annually was roughly 1 kg/m$^{-2}$. Based on the amount of leaves and the concentrations of the heavy metals lead, zinc and cadmium measured in the leaves, conclusions can be drawn regarding the maximum annual metal flow attainable with the previously identified plants with the fall of leaves to the soil surface (component process C, compare FIG. 3).

EXAMPLE 4

Leaching of Metal from the Discarded Leaves of Metal-accumulating Woody Plants

In leaching tests (percolation of water through a leaf layer) in the laboratory the leachability of metals (lead, zinc and cadmium) out of decomposing leaves was determined. The heavy metal concentrations in the leaves were 20 mg Cd/kg$^{-1}$, 200 mg Pb/kg$^{-1}$ and 1500 mg Zn/kg$^{-1}$. These values are clearly less than the heavy metal concentrations in the leaves of the best individuals (compare FIG. 2). The results (FIG. 4) still yield indications of the magnitude of the metal flow and the attainable concentrations in the drainage water for the heavy metals lead, cadmium and zinc. They represent one example for the total of component processes D and E. It also becomes clear from the results that microbial decomposition in the release of metal into the percolating drainage water plays an important role, since the leaching from the 0 horizon clearly exceeds that from fresh leaves.

FIG. 5

Fixing of Heavy Metal by Vermiculite

In addition to other materials, the clay mineral vermiculite was tested for its suitability as a reactive material for the layer which chemically and/or physically binds the pollutants. Vermiculite has a high density of permanent, negative charges on the particle surfaces and in the intermediate layers and is available for example as a residue from industrial processes. Vermiculite retains 83 to 99% of the lead when the lead is present in the concentration range between 0.001 and 1000 mg/l$^{-1}$. The corresponding retention rates for cadmium were 87 to 98% and for zinc 71 to 99% (concentration range for zinc between 0.1 and 1000 mg/kg$^{-1}$). The results show that vermiculite has a high retention capacity for these metals.

In a leaching test the binding of calcium, lead and zinc by a vermiculite layer (layer thickness: 2 cm) was studied. The amounts of metal leached out of the overlying leaves or leaves+0 horizon in three months were fixed for all three metals in vermiculite at more than 97.5%. The results indicate the possible lifetime (for a given layer thickness) of a vermiculite layer which chemically and/or physically binds the pollutants and the attainable high efficiency of the component process F (fixing of heavy metals) for the metals lead, cadmium and zinc.

EXAMPLE 6

Estimation of Attainable Cadmium Flows when Using the Best Individual Willows

The cadmium flows attainable with the best individual willows studied to date are shown in FIG. 5. For total contents of cadmium in the soil on the order of 15 mg/kg$^{-1}$ (for a rehabilitation depth of 0.5 m and a storage density of the soil of roughly 1250 kg/m$^{-3}$ this corresponds to roughly 10000 mg cadmium/m$^{-2}$) up to more than 100 mg Cd can be absorbed into the willows. Based on leaf studies at the Arnoldstein site (in the leaves up to 103 mg Cd/kg$^{-1}$ dry substance of leaves) at an amount of fallen leaves of 1 kg/m$^{-2}$ recirculation to the soil surface of roughly 100 mg/m$^{-2}$ can be achieved. At an efficiency of vermiculite of 98% (compare example 5), annually 98 mg/m$^{-2}$ can be fixed in the layer which chemically and/or physically binds the pollutants, only 2 mg/m$^{-2}$ return to the soil. With the cadmium removal rates which have been computed in this manner it is possible for the easily available and mobile cadmium (measured in 1 M NH$_4$NO$_3$ extract) to be extracted within six years from the soil in Arnoldstein. Thus, the risk potential of the site with respect to leaching and toxicity for soil organisms in spite of the high burden would be greatly reduced in a few years.

In its preferred embodiments the process of the invention compared to existing processes offers the following advantages and opens up important applications.

1) Only minor interventions into the system, thus extensive preservation of the original substrate properties, prevention of substrate excavation and movements, thus minimum exposure of workers;

2) More economical than conventional phytoremediation technologies since neither harvesting nor subsequent composting or dumping of the biomass is necessary. In this way the labor cost and use of funds for machinery are less.

3) The component process of phytoextraction is more efficient since the growth cycle of the plants is not interrupted by harvesting of biomass;

4) The duration of treatment until the clean-up objective is reached is shorter;

5) In the layer which chemically and/or physically binds the pollutants, "fixed" pollutants can be concentrated by extraction with a solvent (for example, EDTA), recovered and/or safely dumped, and in the latter case the dump volume compared to the contaminated substrate can be very greatly reduced. Thus, valuable dump space and the associated costs can be saved, and by recovering economically valuable metals income can be earned.

6) Production of renewable energy sources or renewable resources such as for example alcohol, biofibers or biospirit from the less contaminated woody plant parts can contribute to the coverage of the costs of rehabilitation and represents an environmentally safe use of the contaminated soil during the rehabilitation phase.

In the ecobalance of the technology proposed in the inventive process the degree of retentiveness increases.

Basically the inventive process can be used on site (in situ) or at a remote site (ex situ). The pollutants which can be treated with the process of the invention comprise compounds or elements which are absorbed by the plants of the phytoremediation stand and are moved into the aboveground biomass and travel with the falling of leaves to the layer which chemically and/or physically binds the pollutants and can be fixed there with relative effectiveness and in a sufficient amount.

Applications include, among others:

1) sites which have been contaminated by radionuclides;
2) sites which have been contaminated by industrial activities such as for example mining and metallurgy, industrial production, etc.
3) sites which are reached by the spilling or leaking of chemicals from shipping or storage containers into the contaminated substrate;
4) dangerous waste in public or private possession;
5) decontamination of pollutant-loaded sediment excavation;
6) soils which have been contaminated geochemically or by volcanic eruptions;
7) Decontamination of large areas in agricultural use in soils with moderate contamination (for example, as a result of atmospheric deposition of pollutants in the recent past) which however have only more limited suitability or value for production of high quality foods, as is desired in long-term, for example, biological cultivation systems, and corresponding demands for environmental standards (for example soil quality) are imposed. Decontamination of these soils by the inventive process improves the soil quality and re-establishes the multifunctionality of use, while in the rehabilitation phase the produce of biomass which is not intended as food is possible.

In summary, one embodiment of the invention will be explained below:

For decontamination of pollutant-burdened soils, sludges, and sediments, perennial woody plants with the ability to accumulate pollutants in the leaves are used. The process is based on a combination of phytoextraction, pollutant transport with the falling of leaves to the soil surface, leaching of pollutants from the leaves decomposing on the soil surface and (physico)-chemical fixing of the pollutants in a reactive layer which is bounded by geotextiles and which physically and/or chemically binds the pollutants.

What is claimed is:

1. A process for decontamination of a material loaded with at least one pollutant selected from the group consisting of heavy metals, metalloids, halides and radionuclides, the process comprising the steps of:

a) positioning roots of woody plants having leaves in the material loaded with the pollutant and removing the pollutant from the material by phytoexraction by the roots of the woody plants extracting the pollutant from the material and transporting the pollutant to the leave of the woody plants;

b) applying a layer of a substance which chemically and/or physically binds the pollutant on the surface of the material in an area below the leaves of the woody plants;

c) collecting and composting the leaves containing the pollutant falling and decomposing on the layer;

d) leaching the pollutant out of the decomposing leaves on the layer;

e) physically and/or chemically binding the leached pollutant in the layer; and f) removing the layer containing the bound pollutant after decontaminating the material.

2. The process as claimed in claim 1, wherein the process step d) comprises passive leaching of the decomposing leaves.

3. The process as claimed in claim 2, wherein passive leaching takes place by water from rain or dew.

4. The process as claimed in claim 1, further comprising grading the material before applying the layer of the substance which chemically and/or physically binds the pollutant.

5. The process as claimed in claim 1, further comprising working the material before applying the layer of the substance which chemically and/or physically binds the pollutant in order to increase the infiltration of drainage water into the material.

6. The process as claimed in claim 1, wherein the layer of the substance which chemically and/or physically binds the pollutant is applied before planting the woody plants on the material surface.

7. The process as claimed in claim 1, further comprising replacing the layer of the substance which chemically and/or physically binds the pollutant when the fixing capacity of the layer falls below a certain threshold.

8. The process as claimed in claim 7, wherein the threshold is 80 to 90% of the pollutant infiltrating into the layer with drainage water.

9. The process as claimed in claim 1, further comprising regenerating the layer of the substance which chemically and/or physically binds the pollutant with the objective of recovering the pollutant.

10. The process as claimed in claim 9, wherein the layer is regenerated by elution with a solvent.

11. The process as claimed in claim 1, wherein the substance which chemically and/or physically binds the pollutant is placed in the form of a mat on the material surface.

12. The process as claimed in claim 11, wherein the substance which chemically and/or physically binds the pollutant is located between two layers of geotextiles.

13. The process as claimed in claim 1, wherein the substance which chemically and/or physically binds the pollutant is spread on the material surface.

14. The process as claimed in claim 13, wherein the substance which chemically and/or physically binds the pollutant is applied as a mixture with at least one carrier material and a binder.

15. The process as claimed in claim 14, wherein the carrier material is straw.

16. The process as claimed in claim 14, wherein the binder is bitumen.

17. The process as claimed in claim 1, wherein the material is mechanically worked to increase permeability.

18. The process as claimed in claim 17, wherein the mechanical working is plowing, trenching, or subsoil loosening.

19. The process as claimed in claim 1, wherein the permeability of the material is increased by adding organic materials and/or inorganic materials.

20. The process as claimed in claim 1, further comprising adding an additive for improving the binding of the pollutant to the substance which binds the pollutant.

21. The process as claimed in claim 20, wherein the additive comprises lime.

22. The process as claimed in claim 1, wherein the pollutant is lead.

23. The process as claimed in claim 1, wherein the pollutant is cadmium.

24. The process as claimed in claim 1, wherein the pollutant is zinc.

25. The process as claimed in claim 1, wherein the woody plants comprise willows (Salix sp.).

26. The process as claimed in claim 1, wherein the woody plants comprise poplars (Populus sp.).

27. The process as claimed in claim 1, wherein the woody plants comprise beeches (Betula sp).

28. The process as claimed in claim 1, wherein the substance which chemically and/or physically binds the pollutant comprises vermiculite.

29. The process as claimed in claim 1, wherein the substance which chemically and/or physically binds the pollutant comprises hydroxyapatite.

30. The process as claimed in claim 1, wherein the substance which chemically and/or physically binds the pollutant comprises iron oxide.

31. The process as claimed in claim 1, wherein the substance which chemically and/or physically binds the pollutant comprises a mixture of vermiculite and iron oxide.

32. The process as claimed in claim 1, wherein the woody plants comprise woody plants inoculated with Mycorrhizae.

33. The process as claimed in claim 1, further comprising fencing in the area of the material loaded with the pollutant.

* * * * *